(12) United States Patent
Tatsuwaki et al.

(10) Patent No.: US 10,889,334 B2
(45) Date of Patent: Jan. 12, 2021

(54) VEHICLE REAR STRUCTURE

(71) Applicant: HONDA MOTOR CO., LTD., Tokyo (JP)

(72) Inventors: Masaaki Tatsuwaki, Wako (JP); Junya Harada, Wako (JP); Shinji Kumagai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 16/295,033

(22) Filed: Mar. 7, 2019

(65) Prior Publication Data
US 2019/0276093 A1 Sep. 12, 2019

(30) Foreign Application Priority Data
Mar. 9, 2018 (JP) ................................ 2018-043398

(51) Int. Cl.
*B62D 25/20* (2006.01)
*B60K 1/04* (2019.01)

(52) U.S. Cl.
CPC ............ *B62D 25/2027* (2013.01); *B60K 1/04* (2013.01); *B62D 25/2036* (2013.01); *B60K 2001/0416* (2013.01); *B60Y 2306/01* (2013.01)

(58) Field of Classification Search
CPC ........ B62D 25/20; B62D 21/11; B62D 21/02; B62D 29/008; B62D 21/00; B62D 25/2036; B62D 25/2018; B62D 21/155; B60K 1/04; B60K 2001/0438; B60K 2001/0433; B60K 2001/0416; B60K 2001/0422; B60K 2001/0427; B60K 2001/0461

USPC ....... 296/204, 193.07, 29, 209, 146.11, 37.6, 296/26.8, 1.08; 29/897.2, 428, 469; 180/312, 65.21, 68.5, 9.42
See application file for complete search history.

(56) References Cited

U.S. PATENT DOCUMENTS

| | | | |
|---|---|---|---|
| 8,534,748 B1 * | 9/2013 | Aghssa | B62D 25/2027 280/794 |
| 9,296,293 B1 * | 3/2016 | Baccouche | B62D 25/20 |
| 9,604,672 B2 * | 3/2017 | Kaneko | B62D 25/2027 |

(Continued)

FOREIGN PATENT DOCUMENTS

| | | |
|---|---|---|
| JP | 2014-210464 A | 11/2014 |
| JP | 2016-185739 A | 10/2016 |

(Continued)

OTHER PUBLICATIONS

Japanese Office Action received in corresponding JP application No. 2018-043398 dated Oct. 1, 2019 with English translation, (6 pages).

*Primary Examiner* — D Glenn Dayoan
*Assistant Examiner* — Sunsurraye Westbrook
(74) *Attorney, Agent, or Firm* — Rankin, Hill & Clark LLP

(57) ABSTRACT

A vehicle rear structure includes a pair of rear side frames provided on right and left sides at a rear part of a vehicle body, and an on-board component disposed between the rear side frames. Each rear side frame includes a protecting part arranged side by side with the on-board component in a vehicle width direction, and a rear extending part extending rearward from the on-board component. A cross member is provided to connect the rear extending parts to each other at positions each located away from a front end and a rear end of the corresponding rear extending part.

7 Claims, 5 Drawing Sheets

(56) References Cited

U.S. PATENT DOCUMENTS

| | | | | |
|---|---|---|---|---|
| 2011/0278881 A1* | 11/2011 | Asai | ................ | B60K 13/04 296/193.07 |
| 2012/0256446 A1* | 10/2012 | Yasuhara | ................ | B62D 25/20 296/193.07 |
| 2012/0306238 A1* | 12/2012 | Midoun | ................ | B60R 11/00 296/204 |

FOREIGN PATENT DOCUMENTS

| JP | 2016-190583 A | 11/2016 |
|---|---|---|
| JP | 2016-196207 A | 11/2016 |

* cited by examiner

VEHICLE REAR STRUCTURE

BACKGROUND OF THE INVENTION

1. Field of the Invention

The present invention relates to a vehicle rear structure.

2. Description of the Related Art

There has been known a conventional vehicle rear structure in which a battery for driving a vehicle is disposed between rear side frames that are arranged on two sides at a rear part of a vehicle body (see Japanese Patent Application Publication No. 2016-196207 or Patent Literature 1, for example). A reinforcement member is disposed along a front-rear direction (a longitudinal direction) in each rear side frame of this vehicle rear structure. A rear end of the reinforcement member extending in the rear side frame stops extending at a position corresponding to a rear end of the battery. In other words, due to the reinforcement member, a front part of this rear side frame located in front of the rear end position of the battery has a larger strength than that of a rear part of the rear side frame behind the rear end position of the battery.

According to the above-described vehicle rear structure, the rear part of each rear side frame crushes earlier than the front part thereof so as to absorb collision energy, while the front part of the rear side frame protects the battery against a collision load.

PRIOR ART DOCUMENT(S)

Patent Literature(s)

Patent Literature 1: JP2016-196207A

SUMMARY OF THE INVENTION

However, regarding the conventional vehicle rear structure (see Patent Literature 1, for example), there may be a case where a collision position is off-center to one side in a vehicle width direction (a right-left direction), whereby a collision load is disproportionately inputted to the rear side frame on this side. If the rear side frame on the one side is solely deformed as a consequence of the disproportionate input of the collision load as mentioned above, the conventional vehicle rear structure may fail to efficiently absorb the collision energy.

Given the circumstances, it is an object of the present invention to provide a vehicle rear structure which is capable of efficiently absorbing collision energy even when a collision load is disproportionately inputted to one of rear side frames.

A vehicle rear structure for solving the aforementioned problem includes a pair of rear side frames provided on right and left sides of a vehicle body, and an on-board component disposed between the rear side frames. Here, each rear side frame includes a protecting part arranged side by side with the on-board component in a vehicle width direction, and a rear extending part extending rearward from the on-board component. Moreover, a cross member is provided to connect the rear extending parts to each other at positions each located away from a front end and a rear end of the corresponding rear extending part.

According to the vehicle rear structure of the present invention, it is possible to efficiently absorb collision energy even when a collision load is disproportionately inputted to one of the rear side frames.

DETAILED DESCRIPTION OF THE EMBODIMENTS

A vehicle rear structure according to an embodiment to carry out the present invention (this embodiment) will be described in detail with reference to the drawings as appropriate. In the following, the present invention will be described in concrete terms based on an example of a vehicle rear structure to be applied to a plug-in hybrid automobile, for instance, which mounts a battery for a drive train.

Figure 1:
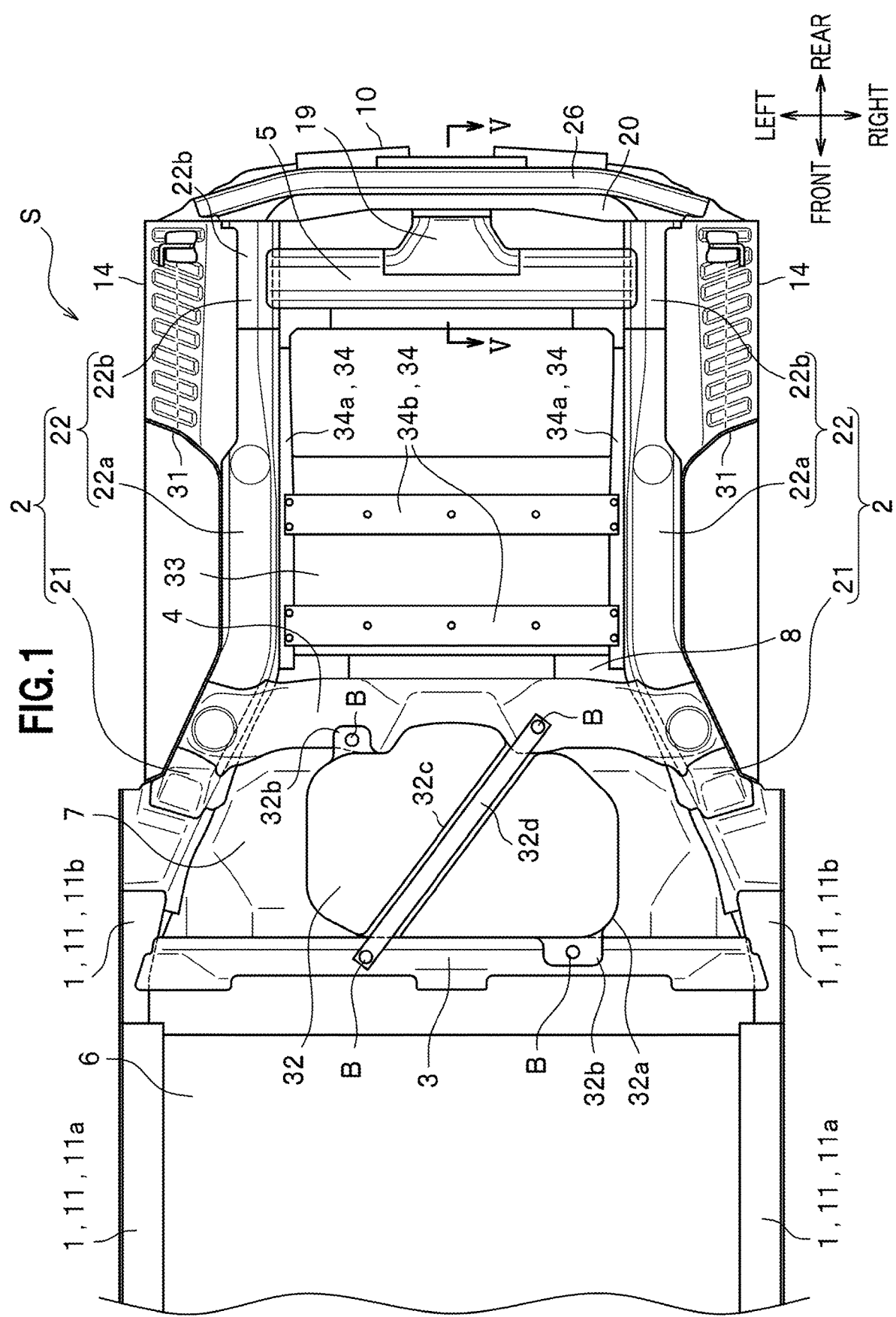
FIG. 1 is a bottom view of a vehicle body including a vehicle rear structure according to an embodiment of the present invention.
Figure 2:
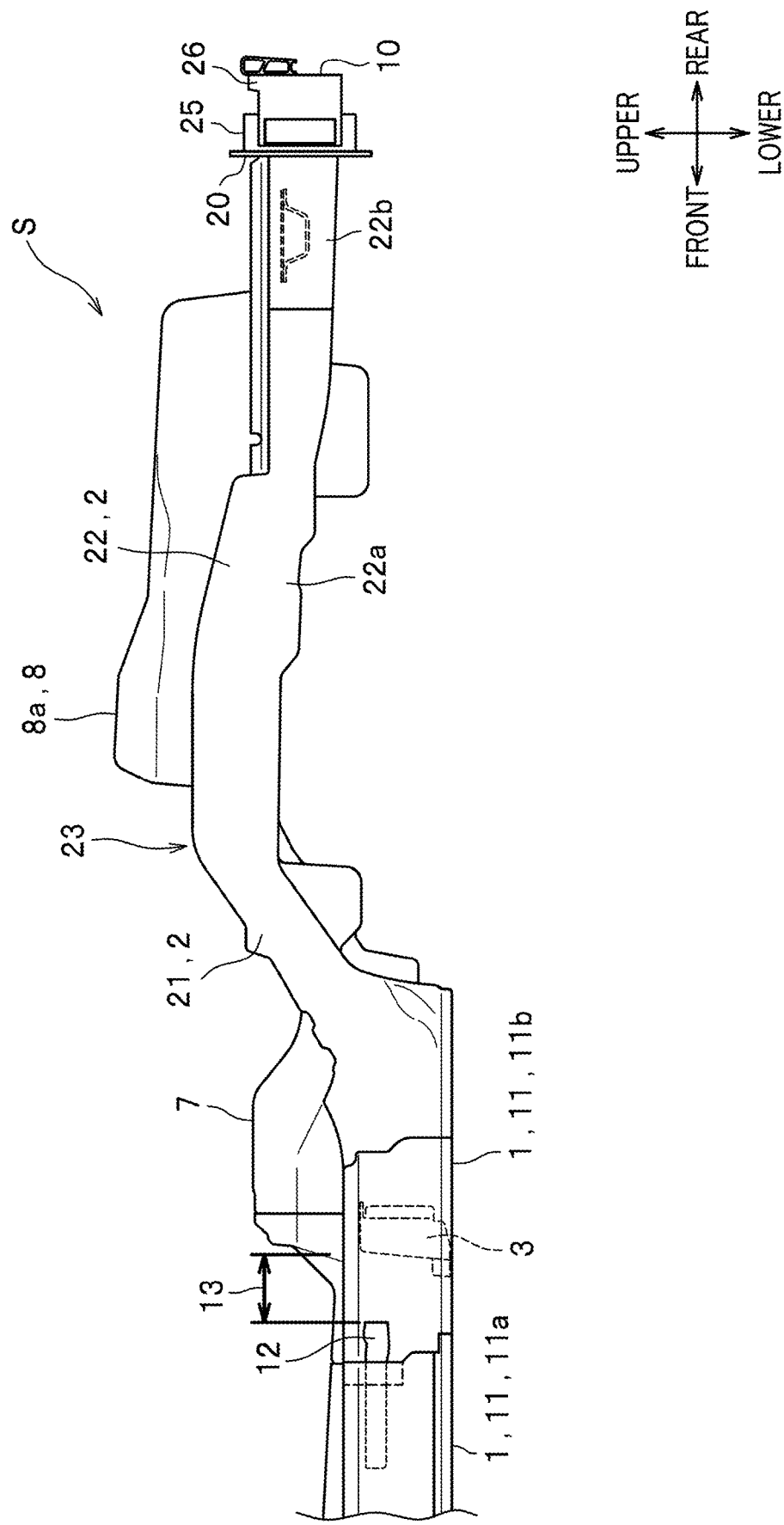
FIG. 2 is a left side view of the vehicle body including the vehicle rear structure according to the embodiment of the present invention.

FIG. 1 is a bottom view of a vehicle body 10 including a vehicle rear structure S of this embodiment and FIG. 2 is a left side view thereof. In the following description, upper, lower, front, rear, left, and right directions coincide with upper, lower, front, rear, left, and right directions viewed from a driver seated in a vehicle. Here, a right-left direction coincides with a vehicle width direction.

As shown in FIG. 1, the vehicle rear structure S of this embodiment includes: side sills 1 located on two sides of the vehicle body 10 and extending in a front-back direction, respectively; rear side frames 2 extending further rearward from rear end portions of the side sills 1; a first cross member 3 that connects rear parts 11b of the after-mentioned side sill inner parts 11 to each other; a second cross member 4 that connects the after-mentioned inclined parts 21 of rear side frames 2 to each other; and a third cross member 5 that connects the after-mentioned rear extending parts 22b of the rear side frames 2 to each other.

Moreover, this vehicle rear structure S includes a fuel tank 32 and a battery 33 for the drive train as on-board components, which are located between the rear side frames 2.

<Side Sill>

Each side sill 1 (see FIG. 1) includes the side sill inner part 11 (see FIG. 1) and a not-illustrated side sill outer part disposed outside in the vehicle width direction of the side sill inner part 11.

The side sill inner part 11 takes on a hat-like form which is open outward in the vehicle width direction in a cross-sectional view. The side sill outer part (not shown) takes on a hat-like form which is open inward in the vehicle width direction in a cross-sectional view. A flange of the side sill inner part 11 and a flange of the side sill outer part (not shown), which correspond to brim portions in the hat-like forms thereof, are joined to each other by welding or the like whereby bulging portions that correspond to crowns in the hat-like forms thereof are integrated together to define a closed cross-section.

Each side sill inner part 11 includes the rear part 11b of the side sill inner part where the first cross member 3 is laid, and a side sill inner part main body 11a which occupies the most part in the front-back direction of the side sill inner part 11 except the rear part 11b.

In FIG. 1, reference sign 6 denotes a front floor panel which is disposed between the side sill inner parts 11 and ahead of the first cross member 3. In the meantime, a middle floor panel 7 to be described later is disposed behind the first cross member 3.

Note that the first cross member 3 of this embodiment is formed from a plate body that is bent in such a way as to extend across the front floor panel 6 and the middle floor panel 7 in a cross-sectional view, and thus defines a closed cross-section between the front floor panel 6 and the middle floor panel 7. Meanwhile, two ends of the first cross member 3 extending in the vehicle width direction are connected to inside portions in the vehicle width direction of the side sill inner parts 11 (the rear parts 11b), respectively.

As shown in FIG. 2, a rear end part of the side sill inner part main body 11a and an outside portion in the vehicle width direction at a front end part of the rear part 11b of the side sill inner part 11 partially overlap each other and are integrally joined together by welding or the like.

Meanwhile, at an upper corner part of the crown in the hat-like form of each side sill inner part 11, there is disposed a reinforcement member 12 extending from side sill inner part main body 11a to the rear part 11b of the side sill inner part 11.

Moreover, a portion of the reinforcement member 12 on the rear part 11b side of the side sill inner part 11 is disposed outside in the vehicle width direction of the rear part 11b and is joined to the rear part 11b by welding or the like.

Meanwhile, a portion of the reinforcement member 12 on the side sill inner part main body 11a side is disposed inside in the vehicle width direction of the side sill inner part main body 11a as indicated with hidden outlines (dotted lines) in FIG. 2, and is joined to the side sill inner part main body 11a by welding or the like.

Note that the reinforcement member 12 of this embodiment is assumed be equal angle steel (angle) which is long in the front-rear direction. Moreover, an angular portion on an outer angle side of the equal angle steel (the angle) is positioned at an inner angle corner portion of the crown in the hat-like form at the rear part 11b of the side sill inner part 11. In the meantime, an angular portion on an inner angle side of the equal angle steel (the angle) is positioned at an outer angle corner portion of the crown in the hat-like form of the side sill inner part main body 11a.

A rear end of the above-described reinforcement member 12 is located ahead of the first cross member 3 (which is indicated with hidden outlines in FIG. 2) in a side view of the vehicle body 10 as shown in FIG. 2.

Moreover, a weak part 13 of the side sill 1 to be described later is formed at a portion of the rear part 11b of the side sill inner part 11, which is located ahead of the first cross member 3 and not provided with the reinforcement member 12.

<Rear Side Frame>

Each rear side frame 2 (see FIG. 1) of this embodiment is assumed to be a member which has a substantially rectangular closed cross-section that extends in the front-rear direction of the vehicle body 10 (see FIG. 1).

As shown in FIG. 2, the rear side frame 2 includes a front-rear part 22 that extends in the front-rear direction from a rear part of the vehicle body 10, and the inclined part 21 that extends downward from a front part of the front-rear part 22 to a rear part of the side sill 1 (obliquely forward and downward). In FIG. 2, reference sign 23 denotes a junction between the inclined part 21 and the front-rear part 22.

First, the inclined part 21 will be described.

As shown in FIG. 1, a front portion of the inclined part 21 is connected to the rear part 11b of the side sill inner part 11. In the meantime, a rear portion of the inclined part 21, which extends rearward while being curved along the inside in the vehicle width direction of a rear wheel arch 31 when viewed from a bottom surface of the vehicle body 10, is connected to a front portion of the front-rear part 22.

Meanwhile, the second cross member 4 extends between the rear portions of the inclined parts 21 as mentioned earlier.

Moreover, the rear parts 11b of the side sill inner parts 11 and the inclined parts 21 of the rear side frames 21 extend in the front-rear direction between the first cross member 3 and the second cross member 4. The middle floor panel 7 is disposed inside in the vehicle width direction of the rear parts 11b and of the inclined parts 21.

Furthermore, a rear floor panel 8 to be described later is disposed behind the second cross member 4.

Note that the second cross member 4 of this embodiment is formed from a plate body that is bent in such a way as to extend across the middle floor panel 7 and the rear floor panel 8 in a cross-sectional view, and thus defines a closed cross-section between the middle floor panel 7 and the rear floor panel 8. Meanwhile, two ends of the second cross member 4 extending in the vehicle width direction are connected to inside portions in the vehicle width direction of the inclined parts 21, respectively.

The middle floor panel 7 of this embodiment is formed so as to bulge upward as shown in FIG. 2. This bulge defines a space below the middle floor panel 7 for housing the fuel tank 32 (see FIG. 1) to be described below.

Incidentally, the fuel tank 32 of this embodiment is assumed to be a resin molded product. The fuel tank 32 is fastened to the first cross member 3 and to second cross member 4 with bolts B by the intermediary of flanges 32b to be formed integrally with a tank main body 32a and of a rod-like tank support member 32d to be fitted into a receiving groove 32c that is formed in a lower surface of the tank main body 32.

Next, the front-rear part 22 will be described.

As shown in FIG. 1, the front-rear part 22 is connected to the rear portion of the inclined part 21 and further extends rearward on the inside in the vehicle width direction of the rear wheel arch 31.

The front-rear part 22 includes a protecting part 22a that is disposed outside in the vehicle width direction of the battery 33, and the rear extending part 22b that extends rearward from a rear end of the battery 33.

The aforementioned rear floor panel 8 is disposed between these front-rear parts 22.

Meanwhile, although it is not illustrated in FIG. 1, a rear floor panel 9 (see FIG. 4) is also disposed above (on the back side of the sheet surface of FIG. 1) the after-mentioned outriggers 14 in such a way as to protrude outward in the vehicle width direction from the rear side frame 2.

The rear floor panel 8 disposed between the front-rear parts 22 includes a bulging portion 8a that bulges upward as shown in FIG. 2. A space for housing the battery 33 (see FIG. 1) is defined on a lower surface side of the bulging portion 8a.

As shown in FIG. 1, the battery 33 of this embodiment takes on a substantially rectangular shape when viewed from the bottom surface of the vehicle body 10. The battery 33 holds battery packs in the inside, each of which is formed from a lithium-ion cell and the like, for instance.

Moreover, the battery 33 is supported by the rear side frame 2 through a battery case mounting frame 34 that is formed from longitudinal members 34a and lateral members 34b.

The protecting part 22a is disposed outside in the vehicle width direction of the battery 33 so as to protect the battery 33 in case of a side collision.

As shown in FIG. 2, the rear extending part 22b is connected to a rear portion of the protecting part 22a and a rear end of the rear extending part 22b that further extends rearward is connected to a front wall of a rear bumper beam 26 through a rear panel 20 and a bumper beam extension 25.

In addition, a compressive strength of the rear extending part 22b of this embodiment is set such that the rear extending part 22b crushes earlier than the weak part 13 provided to the side sill 1 by a load in case of a rear collision.

Meanwhile, a compressive strength of the weak part 13 is set lower than a compressive strength of the junction 23 between the inclined part 21 and the front-rear part 22.

In other words, the above-mentioned compressive strengths can be appropriately set in such a way as to satisfy the following relational expression, namely, the compressive strength of the rear extending part 22b<the compressive strength of the weak part 13<the compressive strength of the 23.

Note that an adjustment of the compressive strengths among these constituents can be achieved, for example, by: adding any of reinforcement members, ribs, and through holes; changing plate thicknesses; selecting appropriate materials; and so forth.

Figure 3:
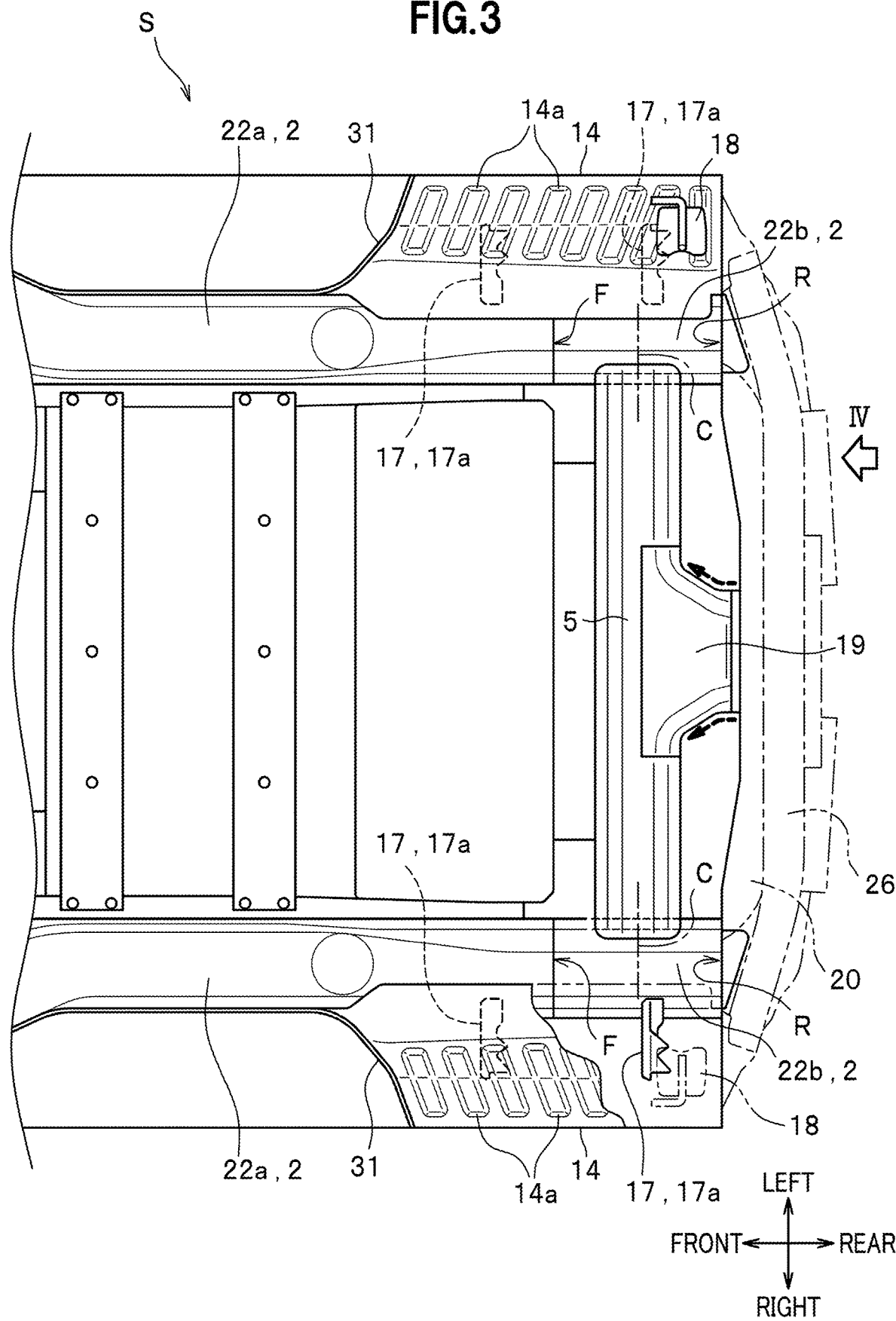
FIG. 3 is a partially enlarged view of a rear part in FIG. 1.

FIG. 3 is a partially enlarged view of a rear part in FIG. 1. Note that the rear panel 20 and the rear bumper beam 26 found in FIG. 1 are indicated with imaginary lines (chain double-dashed lines) in FIG. 3. Moreover, the outrigger 14 found on the right side in FIG. 1 is partially cut away in FIG. 3.

As shown in FIG. 3, the above-mentioned third cross member 5 extends between inner sides in the vehicle width direction of the rear extending parts 22b.

Each of two end portions of the third cross member 5 extending in the vehicle width direction is connected by welding or the like to an inner side surface in the vehicle width direction of the corresponding rear extending part 22b.

The third cross member 5 of this embodiment connects the rear extending parts 22b to each other at positions located away from front ends F and rear ends R of the rear extending parts 22b, respectively.

Specifically, the third cross member 5 connects central parts C in the front-rear direction of the rear extending part 22b to each other.

Moreover, the outriggers 14 are disposed outside in the vehicle width direction of rear parts of the rear side frames 2.

Each outrigger 14 of this embodiment is formed from a bent plate body that protrudes outward in the vehicle width direction from the rear part of the rear side frame 2 at a location behind the rear wheel arch 31.

To be more precise, the outrigger 14 is disposed behind the rear wheel arch 31 and across a region from the protecting part 22a to the rear extending part 22b of the rear side frame 2.

Moreover, the outrigger 14 is provided with multiple beads 14a in such a way as to be arranged in parallel in the front-rear direction. The beads 14a of this embodiment are assumed to be obtained by subjecting the aforementioned plate body to press forming.

Figure 4:
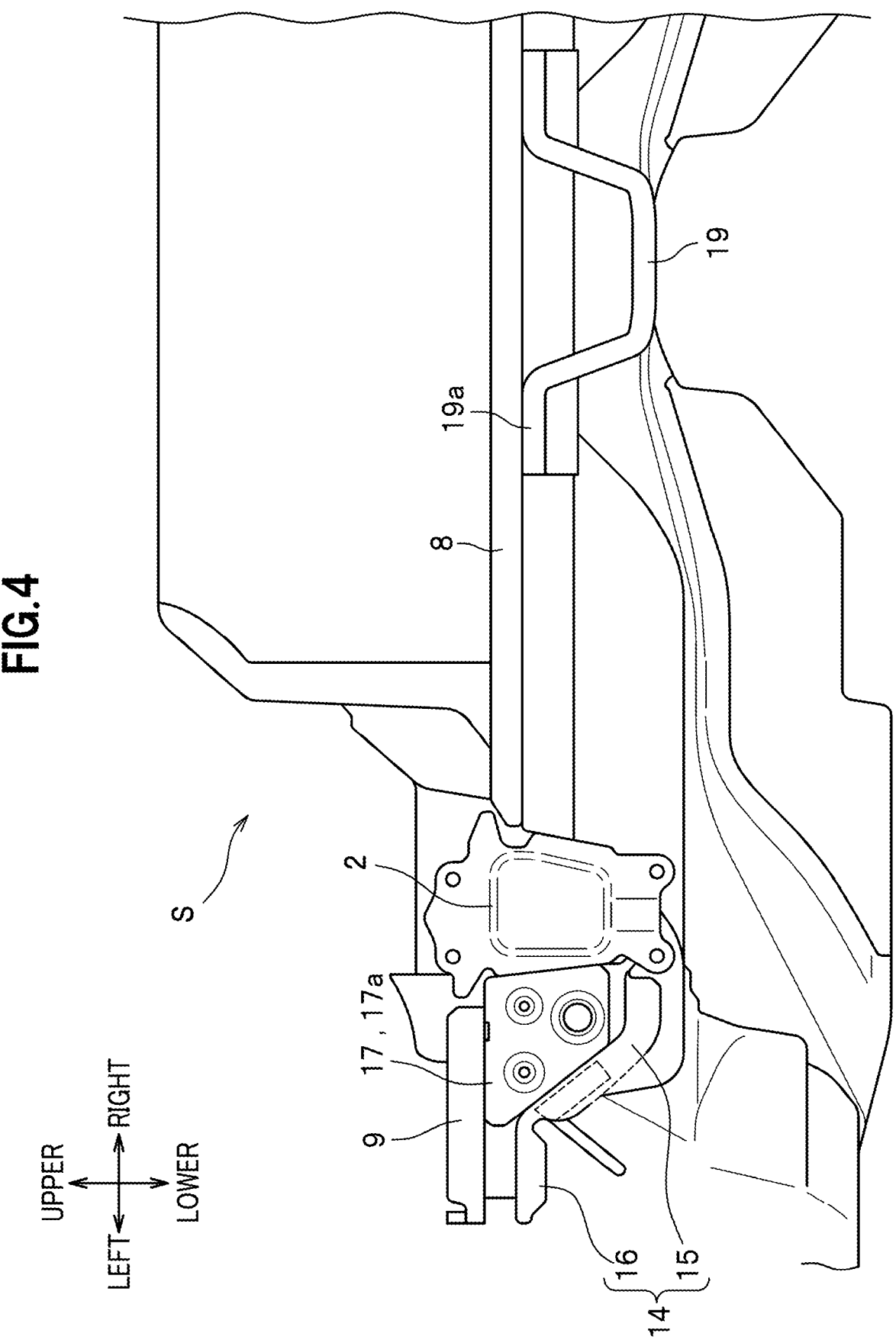
FIG. 4 is a partially enlarged rear view of the vehicle body viewed from a direction indicated with an arrow IV in FIG. 3.

FIG. 4 is a partially enlarged rear view of the vehicle rear structure S viewed from a direction indicated with an arrow IV in FIG. 3.

As shown in FIG. 4, the outrigger 14 mainly includes: an outrigger main body 15 that covers a corner portion defined by an outer side surface in the vehicle width direction of the rear side frame 2 and the rear floor panel 9 that protrudes outward in the vehicle width direction from an upper end of the rear side frame 2; and a flange 16 that extends from an outer side in the vehicle width direction of the outrigger main body 15.

In the outrigger 14, an inner side end portion in the vehicle width direction of the outrigger main body 15 is joined to the rear side frame 2 by welding or the like while the flange 16 is joined to a lower surface of the rear floor panel 9 by welding or the like.

Thus, the outrigger 14 defines a closed cross-section in a right angle trapezoidal shape between the rear side frame 2 and the rear floor panel 9.

Moreover, each outrigger 14 includes multiple (which are two in this embodiment) outrigger reinforcement portions 17 located in the closed cross-section as shown in FIG. 3.

Each outrigger reinforcement portion 17 is provided at a certain part in the front-rear direction of the outrigger 14, and extends in the vehicle width direction.

Meanwhile, at least one of the outrigger reinforcement portions 17 is arranged side by side with the third cross member 5 in the vehicle width direction.

Here, it is also possible to provide only one outrigger reinforcement portion 17 in the front-rear direction of the outrigger 14.

Each outrigger reinforcement portion 17 of this embodiment is assumed to be formed from a plate body having such a shape that corresponds to the closed cross-section. Specifically, the outrigger reinforcement portion 17 is assumed to be a bulkhead (a dividing wall) formed from a plate body having a planar shape of a right angle trapezoid as shown in FIG. 4.

As shown in FIG. 3, a support bracket 18 for supporting an exhaust pipe (not shown) is fitted to the above-described outrigger 14.

The support bracket 18 is integrally connected to the outrigger reinforcement portion 17 (a bulkhead 17a) through the outrigger main body 15 by triple welding or the like.

As shown in FIG. 3, the vehicle rear structure S of this embodiment includes a connection member 19 that extends from the center in the vehicle width direction of the third cross member 5 to a rear end of the vehicle body 10.

The connection member 19 of this embodiment is formed from a bent plated body.

As indicated with arrows in dotted lines in FIG. 3, the connection member 19 spreads to both sides in the vehicle width direction from a rear end side to a front end side of the connection member 19 when viewed from the bottom surface of the vehicle body 10. The connection member 19 connects the third cross member 5 to the rear panel 20.

As shown in FIG. 4, a rear end surface of the connection member 19 of this embodiment takes on a hat-like form.

Figure 5:
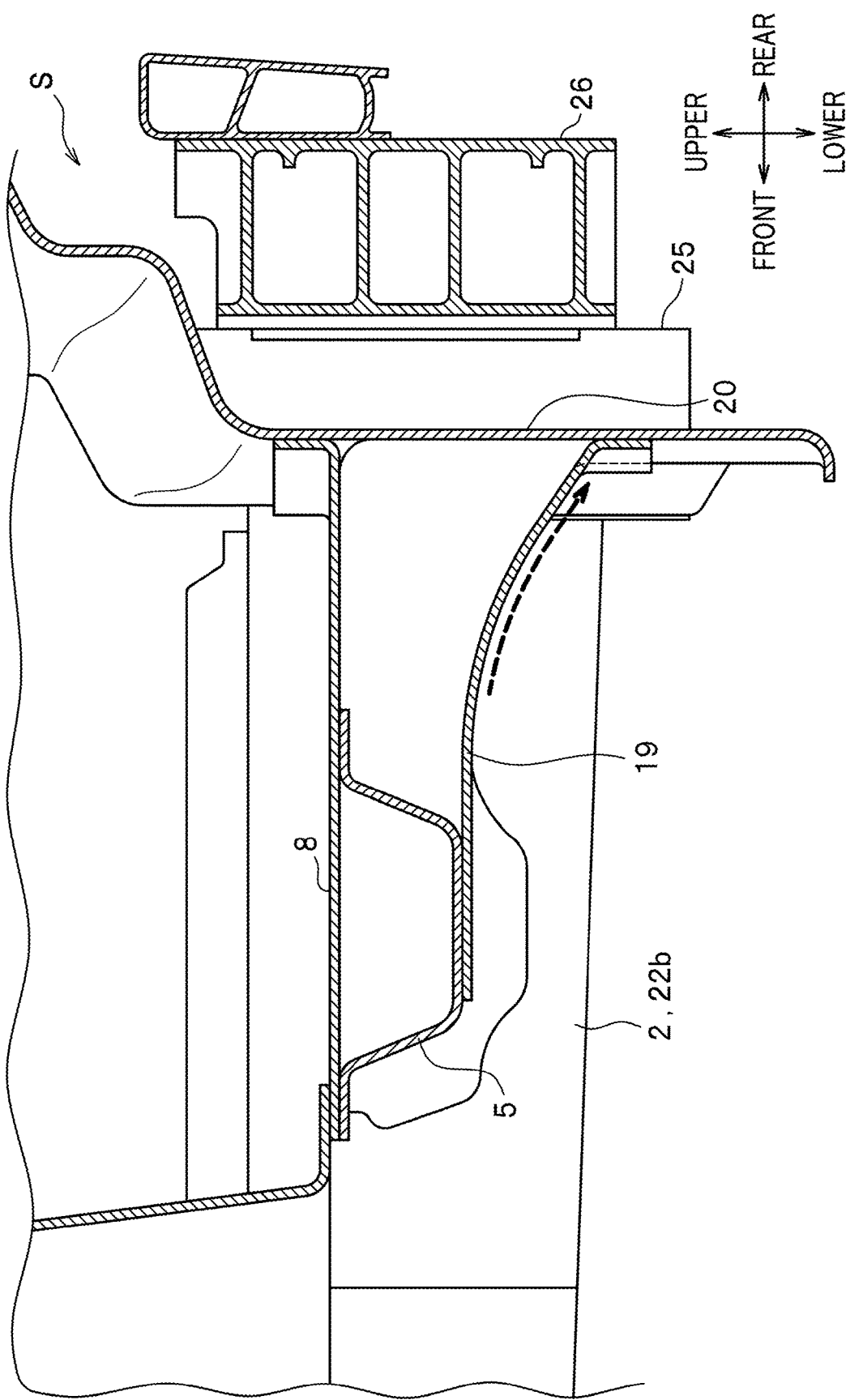
FIG. 5 is a cross-sectional view taken along a V-V line in FIG. 1.

FIG. 5 is a cross-sectional view taken along a V-V line in FIG. 1.

As shown in FIG. 5, the connection member 19 is set such that a height of a crown of its hat-like form is gradually reduced from the rear end side to the front end side.

In other words, as indicated with an arrow in a dotted line in FIG. 5, the connection member 19 gradually spreads in an upper-lower direction from the front end side to be connected to the third cross member 5 to the rear end side to be connected to the rear panel 20.

In FIG. 5, reference sign 8 denotes the rear floor panel and reference sign 22b denotes the rear extending part of the rear side frame 2 on the right side which is observed beyond the connection member 19. Reference sign 26 denotes the rear bumper beam to be connected to the rear end of the rear extending part 22b through the rear panel 20 and the bumper beam extension 25.

Here, a flange 19a (see FIG. 4) corresponding to a brim of the hat-like form of the connection member 19 is connected to a lower surface of the rear floor panel 8 by welding or the like. Thus, the connection member 19 defines a closed cross-section in conjunction with the rear floor panel 8.

<Operation and Effects>

Next, operation and effects to be achieved by the vehicle rear structure S of this embodiment will be described.

In the vehicle rear structure S of this embodiment, each side sill 1 includes the weak part 13 located ahead of the fuel tank 32 as an on-board component. Moreover, the compressive strength of the weak part 13 is lower than that of a region of the rear side frame 2 arranged side by side with the battery 33 as another on-board component or with the fuel tank 32.

According to the vehicle rear structure S, it is possible to absorb collision energy by deforming the weak part 13 of the side sill 1 earlier than the region of the rear side frame 2 arranged side by side with the battery 33. Thus, the vehicle rear structure S can easily prevent the fuel tank 32 and the battery 33 from deformations.

Moreover, the vehicle rear structure S includes the first cross member 3, which is located ahead of the fuel tank 32 and the battery 33 (the on-board components) and configured to connect the side sills 1 to each other, and the weak parts 13 are provided ahead of the first cross member 3.

According to the vehicle rear structure S, the first cross member 3 can increase the compressive strength between each weak part 13 and the set of the fuel tank 32 and the battery 33. In this way, the vehicle rear structure S can deform the weak parts 13 without affecting the fuel tank 32 and battery 33 in case of a rear collision.

Meanwhile, in the vehicle rear structure S, each side sill 1 includes the reinforcement member 12 located at a certain part in the front-rear direction of the side sill 1, and the weak part 13 is formed by a gap between the reinforcement member 12 and the first cross member 3 that are separated from each other.

According to the vehicle rear structure S, it is possible to form the weak part 13 in the side sill 1 by adopting a simple structure of providing the gap between the first cross member 3 and the reinforcement member 12 for reinforcing the side sill 1.

Meanwhile, in the vehicle rear structure S, each rear side frame 2 includes the rear extending part 22b that extends backward from the battery 33 (the on-board component), and the compressive strength of the rear extending part 22b is lower than that of the region of the rear side frame 2 arranged side by side with the battery 33 (the on-board component).

According to the vehicle rear structure S, it is possible to absorb the collision energy by deforming the rear extending part 22b in case of a rear collision. Thus, the vehicle rear structure S can protect the battery 33 (the on-board component) more reliably.

Meanwhile, in the vehicle rear structure S, the compressive strength of the rear extending part 22b is lower than that of the weak part 13.

According to the vehicle rear structure S, it is possible to deform the rear extending part 22b earlier than the weak part 13. Thus, the vehicle rear structure S can absorb the collision energy more promptly.

Incidentally, in a structure configured to deform the rear extending part 22b after the deformation of the weak part 13 unlike the aforementioned vehicle rear structure S, the rear side frame 2 may possibly be tilted when the weak part 13 is deformed earlier. As a consequence, this configuration may cause a change in direction of input of the impact load and lead to a failure to bring about the deformation as expected.

On the other hand, according to the vehicle rear structure S of this embodiment, the rear extending part 22b is deformed earlier than the weak part 13. Thus, the vehicle rear structure S can achieve the deformation as expected and absorb the collision energy more reliably.

Meanwhile, in the vehicle rear structure S, the compressive strength of the weak part 13 is lower than that of the junction 23 between the front-rear part 22 and the inclined part 21.

In general, a stress is more likely to concentrate on a corner portion like the junction 23 in case of a rear collision. For this reason, according to a configuration in which the compressive strength of the junction 23 is lower than the compressive strength of the weak part 13, the junction 23 is likely to be deformed earlier than the weak part 13. Here, if the junction 23 is deformed earlier than the weak part 13, the fuel tank 32 and the battery 33 may interfere with each other.

On the other hand, according to the vehicle rear structure S of this embodiment, it is possible to deform the weak part 13 earlier than the junction 23. Thus, the vehicle rear structure S can avoid the interference of the fuel tank 32 with the battery 33.

Meanwhile, the vehicle rear structure S includes the second cross member 4 that connects the junctions 23 to each other. Here, the fuel tank 32 (the on-board component) is provided ahead of the second cross member 4 and the battery 33 (the on-board component) is provided behind the second cross member 4.

According to the vehicle rear structure S, it is possible to increase the compressive strength of the junctions 23 by using the second cross member 4.

In addition, according to the vehicle rear structure S, it is possible to absorb the collision energy by deforming the weak part 13 earlier than the junction 23, and thus to avoid a situation in which the fuel tank 32 and the battery 33 interfere with each other due to the reduction in distance between the fuel tank 32 and the battery 33.

Moreover, since the vehicle rear structure S can avoid the situation in which the fuel tank 32 and the battery 33 interfere with each other due to the reduction in distance between the fuel tank 32 and the battery 33, it is also possible to dispose the fuel tank 32 and the battery 33 at a close distance. Thus, the vehicle rear structure S can overcome the constraint on an underfloor layout due to an increase in distance between the fuel tank 32 and the battery 33.

Meanwhile, in the vehicle rear structure S, the third cross member 5 connects the rear extending parts 22*b* to each other at the positions located away from the front ends F and the rear ends R of the rear extending parts 22*b*, respectively.

In the vehicle rear structure S, the rear extending parts 22*b* are connected to each other by using the third cross member 5. Accordingly, even if the collision load acts on one of the rear extending parts 22*b* disproportionately, it is still possible to deform the other rear extending part 22*b*. Thus, the vehicle rear structure S can absorb the collision energy more efficiently.

Moreover, according to the vehicle rear structure S, the rear extending parts 22*b* are connected to each other at the positions located away from the front ends F and the rear ends R of the rear extending parts 22*b*, respectively. This makes it possible to conduct two-step crush of firstly causing the portions behind the third cross member 5 to crush and then causing the portions ahead of the third cross member 5 to crush.

Thus, the vehicle rear structure S cause the rear extending part 22*b* to crush more reliably and nicely.

Meanwhile, in the vehicle rear structure S, the third cross member 5 connects the central parts C in the front-rear direction of the rear extending part 22*b* to each other.

According to the vehicle rear structure S, a crush region behind the third cross member 5 and a crush region ahead of the third cross member 5 can be set to a substantially equal length. Thus, the vehicle rear structure S can more reliably prevent an imbalance in deformation between the rear extending parts 22*b*.

Meanwhile, in the vehicle rear structure S, the third cross member 5 and the outrigger reinforcement portions 17 are arranged in the vehicle width direction.

According to the vehicle rear structure S, the outrigger reinforcement portions 17 can suppress a forward displacement of the third cross member 5. Thus, the vehicle rear structure S can more reliably cause the portions of the rear extending parts 22*b* ahead of the third cross member 5 to crush after causing the portions of the rear extending parts 22*b* behind the third cross member 5 to crush.

Moreover, according to the vehicle rear structure S, it is also possible to transmit a rear collision load to each outrigger reinforcement portion 17 side through the third cross member 5. Thus, the vehicle rear structure S can absorb the collision energy by deforming the outriggers 14.

Meanwhile, in the vehicle rear structure S, each outrigger reinforcement portion 17 is formed from the bulkhead 17*a* disposed inside the outrigger 14.

According to the vehicle rear structure S, it is possible to suppress the forward displacement of the third cross member 5 by using each bulkhead 17*a* that maintains the closed cross-sectional shape of the corresponding outrigger 14. Thus, the vehicle rear structure S can simplify a structure for absorbing the collision energy.

Meanwhile, in the vehicle rear structure S, the support bracket 18 for supporting the exhaust pipe (not shown) is connected to each bulkhead 17*a*.

According to the vehicle rear structure S, the bulkhead 17*a* reinforced by the third cross member 5 can support the support bracket 18. Thus, the vehicle rear structure S can increase stiffness to support the exhaust pipe (not shown).

Meanwhile, the vehicle rear structure S includes the connection member 19 that extends from the center in the vehicle width direction of the third cross member 5 to the rear end of the vehicle body 10.

According to the vehicle rear structure S, if the rear collision load disproportionately acts on one side in the vehicle width direction, it is still possible to transmit the collision load to the central position of the third cross member 5. In this way, even when the collision load disproportionately acts on one of the rear extending parts 22*b*, the vehicle rear structure S can deform the other rear extending part 22*b*. Thus, the vehicle rear structure S can absorb the collision energy more efficiently.

Meanwhile, in the vehicle rear structure S, the connection member 19 spreads to both sides in the vehicle width direction from the rear end side to the front end side of the connection member 19.

According to the vehicle rear structure S, it is possible to avoid such a deformation that the connection member 19 buckles in the vehicle width direction relative to the third cross member 5 due to the collision load transmitted from the rear end of the vehicle body 10 to the connection member 19. Thus, the vehicle rear structure S can more reliably transmit the collision load forward.

Meanwhile, in the vehicle rear structure S, the connection member 19 spreads in an upper-lower direction from the front end side to the rear end side of the connection member 19.

According to the vehicle rear structure S, it is possible to receive the collision load transmitted from the rear end of the vehicle body 10 to the connection member 19 by a larger area. Thus, the vehicle rear structure S can more reliably transmit the collision load forward.

Although the embodiment of the present invention has been described above, it is to be understood that the present invention is not limited to the above-described embodiment but can be realized in various other modes.

In this embodiment, the present invention has been specifically explained by using the example of the vehicle rear structure that is applicable to a hybrid automobile and the like. However, the present invention is also applicable to an electric vehicle or an ordinary automobile with its drive train consisting of an internal combustion engine. In this context, the on-board component in the vehicle rear structure to be applied to the electric vehicle represents the battery while the on-board component in the vehicle rear structure to be applied to the ordinary automobile represents the fuel tank.

Although the above-described embodiment discusses the fuel tank 32 and the battery 33 as the examples of the on-board components, the on-board components adaptable to the present invention are not limited to the foregoing. For instance, a driving electric motor, a transmission gear, a fuel cell as well as a hydrogen tank in a fuel cell vehicle, and other publicly known on-board components to be disposed inside in the vehicle width direction of the rear side frames 2 correspond to the on-board components adaptable to the present invention.

What is claimed is:

1. A vehicle rear structure comprising:
 a pair of rear side frames provided on right and left sides at a rear part of a vehicle body;
 an on-board component disposed between the rear side frames;
 a pair of outriggers each extending outward in a vehicle width direction from a respective one of the pair of rear side frames; and
 a pair of outrigger reinforcement portions each provided at a certain part in a front-rear direction of a respective one of the pair of outriggers and extending in the vehicle width direction, wherein
 each rear side frame includes
  a protecting part arranged side by side with the on-board component in the vehicle width direction, and a rear extending part extending rearward from the on-board component, and a cross member is provided to connect the rear extending parts to each other at positions each located away from a front end and a rear end of the corresponding rear extending part, the cross member and the pair of outrigger reinforcement portions are arranged side by side in the vehicle width direction, and an inner side end portion in the vehicle width direction of each of the pair of outriggers is joined to the respective one of the pair of rear side frames.

2. The vehicle rear structure according to claim 1, wherein the cross member connects central parts in a front-rear direction of the rear extending parts to each other.

3. The vehicle rear structure according to claim 1, wherein each outrigger has a closed cross-sectional shape, and each outrigger reinforcement portion is a bulkhead disposed inside the closed cross-sectional shape.

4. The vehicle rear structure according to claim 3, comprising:

a support bracket configured to support an exhaust pipe, wherein the support bracket is connected to each bulkhead.

5. The vehicle rear structure according to claim 1, comprising:

a connection member extending from a center in the vehicle width direction of the cross member to a rear end of the vehicle body.

6. The vehicle rear structure according to claim 5, wherein the connection member spreads to both sides in the vehicle width direction from a rear end side to a front end side of the connection member.

7. The vehicle rear structure according to claim 5, wherein the connection member spreads in an upper-lower direction from a front end side to a rear end side of the connection member.

* * * * *